G. I. Washburn,
Steam-Boiler Condenser.
N° 40,872. Patented Dec. 8, 1863.
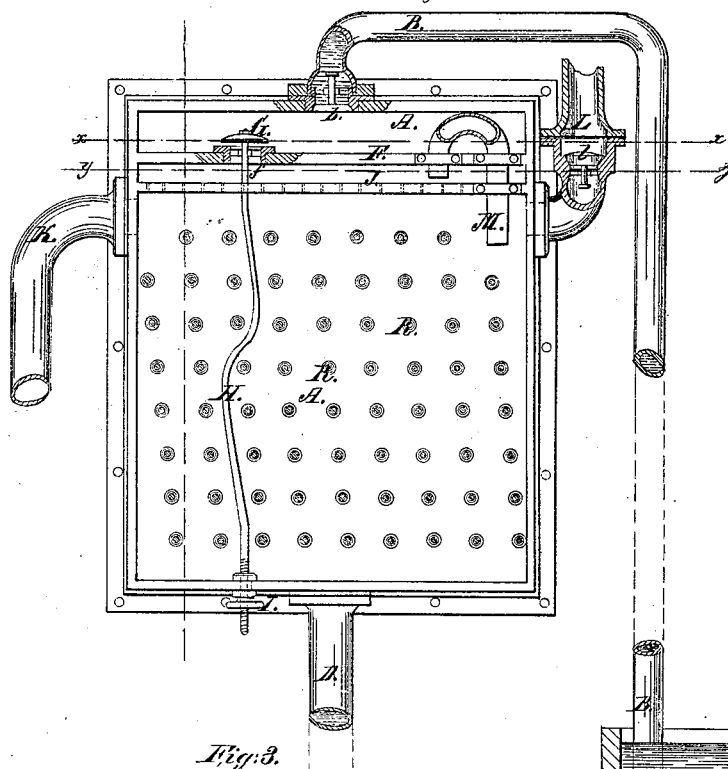
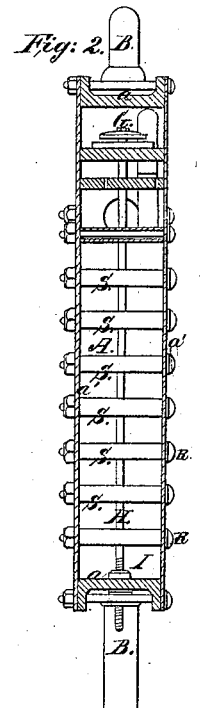
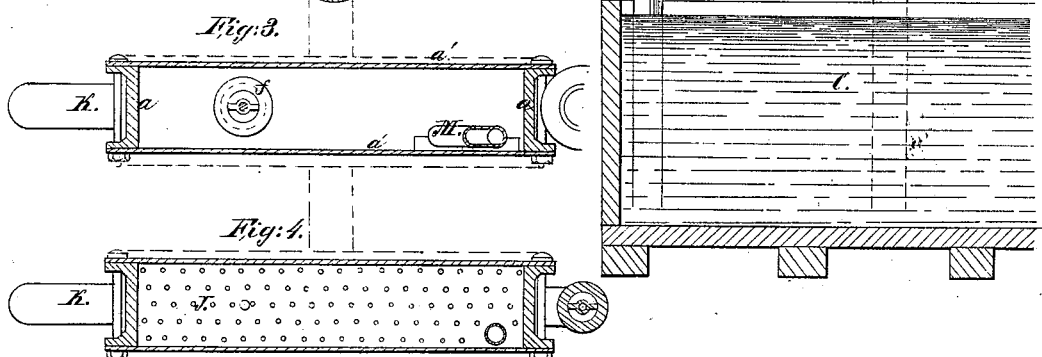
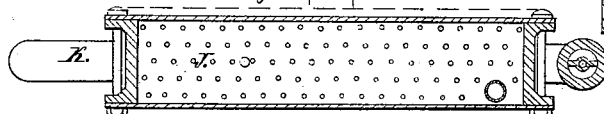
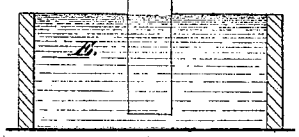
Witnesses:
Inventor:

UNITED STATES PATENT OFFICE.

GEORGE I. WASHBURN, OF WORCESTER, MASSACHUSETTS.

IMPROVED CONDENSER.

Specification forming part of Letters Patent No. 40,872, dated December 8, 1863.

*To all whom it may concern:*

Be it known that I, GEORGE I. WASHBURN, of the city and county of Worcester, in the State of Massachusetts, have invented a certain new and useful Improvement in Condensers; and I do hereby declare the following to be a full and exact description of the same, reference being had to the accompanying drawings, making part of this specification, in which—

Figure 1 is a side elevation of a condenser illustrating my invention, with one side removed, some parts being shown in section. Fig. 2 is a vertical transverse section of the same. Fig. 3 is a horizontal section of the same at $x$ $x$, Fig. 1. Fig. 4 is a horizontal section thereof at $y$ $y$, Fig. 1.

Similar letters of reference indicate corresponding parts in the several views.

The subject of this invention is an "intermittent siphon-condenser," it being an improvement in that class of condensers in which the siphon principle is employed to convey condensing-water to an elevated tank, or in which the elevation of the condensing tank above the level of the reservoir into which the water of condensation is discharged is made the means of maintaining a vacuum within the said condensing-tank.

It has heretofore been proposed to condense steam and other vapors by introducing them into a tight tank, within which a partial vacuum is maintained by immersing the lower end of the exit-tube in a body of water, the surface of which is more than thirty-three feet below the condensing-tank, so that injection or condensing water contained in a reservoir less than thirty-three feet below the condensing-tank may be forced up by atmospheric pressure and delivered in a constant shower or spray within the condensing-tank, while the latter is kept from filling by the height of the descendingn column in the discharge-tube. In spray or shower condensers of this construction formidable difficulties have been found to exist in regulating the injection or condensing water. An insufficiency of water passing through the tank to effect the instantaneous condensation of the steam will soon cause the tank to be filled with steam, destroying the vacuum therein and preventing the action of the siphon. The injection-pipe will then cease to supply water until the vacuum shall have been restored by the condensation of the steam within the tank by external radiation, and in the meantime no provision existing for the condensation of steam from the engine, pressure will increase within the condenser until the engine is retarded or stopped.

To obviate these difficulties is the principal object of my present invention; and to this end the invention consists, first, in imparting to a siphon-condenser an intermittent character, so as to afford time for the complete condensation of the steam, as hereinafter explained; second, in the use of a chamber in the supply-pipe, or in the upper part of the condenser, within which chamber a body of water may be retained to continue the shower in the event of pressure occurring within the tank; third, in the use of a check-valve to prevent the reflux of water down the supply-pipe; fourth, in a device to equalize pressure throughout the tank, and effect the condensation of any steam which may ascend above the perforated diaphragm; fifth, in a device to relieve any excessive pressure within the tank.

In order that others skilled in the art to which my invention appertains may be enabled to fully understand and use the same, I will proceed to describe its construction and operation.

A represents an air-tight tank fitted with an injection-pipe, B, to convey water by atmospheric pressure from a reservoir, C, located less than thirty-three feet below, and deliver it into the upper part of the tank.

$b$ is a check-valve in the mouth of the pipe B, which valve may, if needful, be balanced with a suitable spring, and is adapted to permit water to flow freely from the supply-pipe into the tank, but in the event of any pressure occurring within the latter to instantly close and prevent any reflux of water down the pipe.

D represents a discharge-pipe, connected with the lower part of the tank A, and immersed at its lower end in a reservoir, E, the surface of the water in which must be more than thirty-three feet below the level of the tank.

Within the tank A, near its upper part, is a horizontal partition or floor, F, forming above it a water-chamber, A', and having an aperture, $f$, the capacity of which may be regulated by an automatic valve, G, attached to a thermal rod, H, adapted to open the port $f$ to a greater extent in the event of an increase of heat within the tank and partially close it as the heat decreases. A further adjustment of the valve may be provided by a screw-nut, I, or other suitable means.

At a short distance below the partition F is a horizontal floor, J, so perforated that any water falling upon it will be distributed over its surface, and passing through it will fall in a fine shower or spray uniformly over all parts of the interior of the tank.

From the above description it will be apparent that the water-chamber A' constitutes in effect an enlargement in the supply-pipe B, the port $f$ constituting the inlet into the condensing-tank proper.

K represents the exhaust pipe from the steam-engine, delivering within the tank directly beneath the perforated floor J.

L represents a safety outlet-pipe, provided with a check-valve, $l$, opening outward to relieve any excessive pressure which might occur within the tank, but preventing the ingress of air. This safety-valve may be held to its seat with any desirable force, and may, if preferred, be applied directly to the exhaust-pipe K, so as to carry off any excess of steam without passing it through the tank.

M represents a siphon-formed pipe, one end of which opens into the tank below the perforated floor J, and its other end close above the said perforated floor, while its central part rises to near the top of the tank.

The external walls of the tank may be formed of flanged plates $a\ a$, of cast iron and boiler-plates $a'\ a'$, connected by bolts R R, passing through sleeves S S, by which the sides are kept from collapsing. These bolts and sleeves are disposed in oblique ranges from top to bottom, as clearly shown in Fig. 1, in order that all may be exposed to the descending shower of water, and thus afford the greatest possible extent of condensing-surface.

Operation: To set the apparatus to work it is only necessary to fill the tank with steam and permit the latter to condense by external radiation, or by a forced injection of water. A vacuum being thus formed within the tank A, and the reservoirs C and E having been properly supplied with water, the external pressure will force water up the discharge-pipe D to a distance of about thirty-three feet, and up the supply-pipe B from the more elevated reservoir C in a continuous stream into the chamber A', which may thus be kept constantly supplied. From this chamber the water descends through the port $f$ onto the perforated floor J, over which it is spread, and through which it descends in a fine shower or spray within the condensing-tank A, from the bottom of which it is carried off as fast as it falls by the exit-pipe D, the capacity of which must be fully equal to or greater than that of the port $f$. The tank A, being elevated above the surface of water in the discharge-tank, or hot-well E, to a greater height than the atmospheric pressure can sustain, a column of water and the exit-pipe D being adapted to carry off water as fast as it can enter through the port $f$, it will be manifest that so long as air is excluded a continuous shower may be made to pass through the tank A without any water being retained therein. If now steam from the exhaust-port of a steam-engine be introduced within the tank A through the pipe K, the first effect will be to partially destroy the vacuum or produce a slight pressure within the tank; but this is only an instantaneous effect, for the check-valve $b$ closes directly, preventing a reflux of water through the pipe B and causing the external pressure to keep the said pipe full. A body of water is thus left in the chamber A', which descends by its gravity through the port $f$ and perforated floor J. The steam is thus instantaneously condensed by contact with the descending shower of water and with the cool metallic surfaces within the tank, and the water of condensation mingling with that passing through the tank will be carried off by the pipe D. If any steam remain within the tank A to be displaced by the descending water, it will find its way upward through the pipe M, but being by this delivered under the surface of the water on the perforated floor J, the complete condensation of the steam is effected before it reaches the top of the chamber. A vacuum being thus re-established within the tank, water again flows in through the pipe B and the work proceeds as before.

This condenser may be applied to either high or low pressure engines, and will in either case greatly enhance the freedom of the exhaust. The safety-valve L will under ordinary circumstances remain closed, but if from any cause the condenser should cease to act, or an insufficient supply of condensing-water should be injected through the pipe B the valve will open and permit the engine to exhaust into the air with the same freedom as if the condenser was dispensed with.

Having thus described my invention, what I claim as new therein, and desire to secure by Letters Patent, is—

1. An intermittent siphon-condenser, constructed and operating substantially as herein described.

2. The employment or use, in a condenser of the construction specified, of a water-chamber, A', to contain a supply of water which may descend by its own gravity in the event of pressure occurring within the tank.

3. The check-valve $b$, employed for the purpose described, in combination with a condenser of the construction specified.

4. The combination of the perforated diaphragm J and siphon-pipe M with the tank A and chamber A', for the purposes set forth.

5. The combination of the safety-valve $l$ with a condenser of the construction described.

The above specification of my improvement in condensers signed this 24th day of September, 1863.

GEO. I. WASHBURN.

Witnesses:
CHARLES SMITH,
JAMES A. GRIDLEY.